F. P. DERR.
MONORAIL SYSTEM.
APPLICATION FILED MAR. 3, 1911.
991,050.
Patented May 2, 1911.
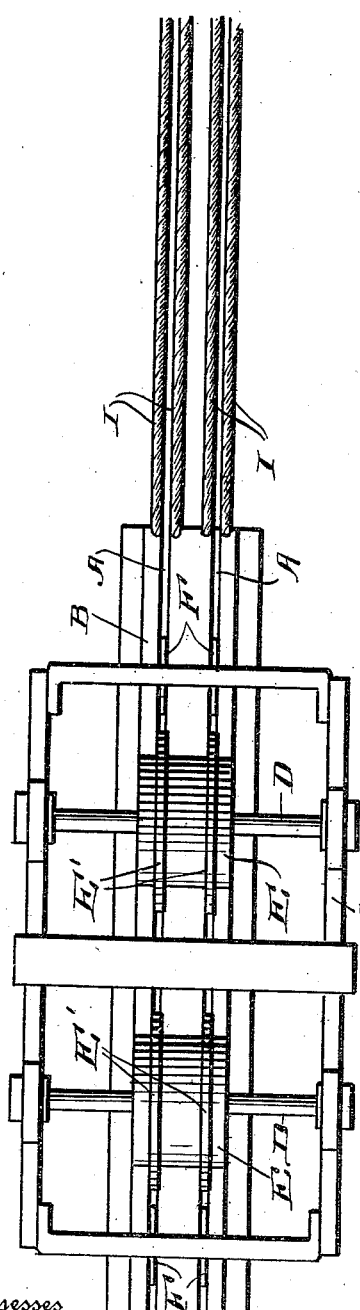
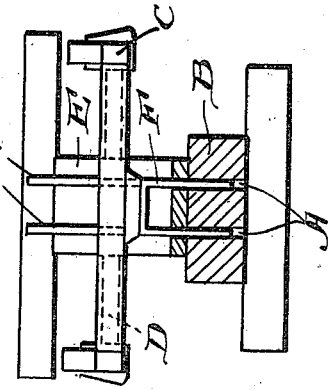
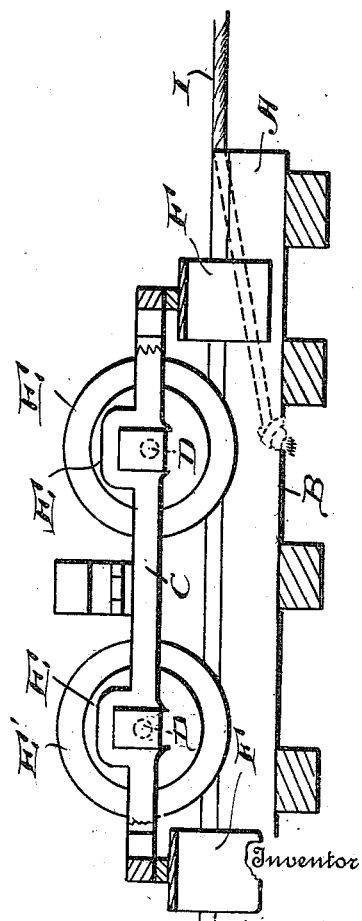

UNITED STATES PATENT OFFICE.

FRANK P. DERR, OF BALTIMORE, MARYLAND.

MONORAIL SYSTEM.

991,050.     Specification of Letters Patent.     Patented May 2, 1911.

Application filed March 3, 1911. Serial No. 612,162.

*To all whom it may concern:*

Be it known that I, FRANK P. DERR, a citizen of the United States, residing at Baltimore city, in the State of Maryland, have invented certain new and useful Improvements in Monorail Systems; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in monorail systems and comprises various details of construction and combinations and arrangements of parts which will be hereinafter fully described and then specifically defined in the appended claims.

I illustrate my invention in the accompanying drawings, in which—

Figure 1 is a top plan view of a monorail truck and track with cables attached to the latter. Fig. 2 is a side elevation, and Fig. 3 is an end view.

Reference now being had to the details of the drawings by letter, A, A designate two slots, parallel to each other, formed in the track B, and C designates the frame of a truck in which the axles D are journaled and upon which the wheels E are mounted, each of which has two flanges E' spaced apart and adapted to engage the two slots in the manner shown clearly in the drawings.

Mounted upon the truck I have shown two axles of similar construction and two wheels and, when the wheels are in place upon the track, it will be noted that the space intermediate the flanges rests upon the upper surface of the track intermediate the slots, while the outer portions of the wheels rest upon the face of the track outside the slots. Pilot members, designated by letter F, are fastened to the cross beam H upon the truck and one is positioned at each slot and serves to further steady the truck.

Fastened to the end of the truck are the cables I arranged in pairs and securely anchored, each pair of cables being positioned one upon either side of the marginal edge of each slot and which are adapted to receive the wheels when the track comes to a crossing where it is desired to dispense with the track, such as through water or other places, the wheels resting upon the two pairs of cables and guided thereby.

By the provision of a monorail system as shown and described, it will be noted that a simple and efficient means is afforded whereby greater stability is afforded by the double flanges upon the wheels which are engaged by the walls of the slot and further guided by the pilots and, when the wheels come in contact with the cables which are taut, the wheels will be held by the contact of the flanges with said cables in the same manner as when the truck is running upon the tracks.

What I claim to be new is:—

1. A monorail system comprising a track having parallel slots therein, a truck, wheels mounted thereon and each having flanges engaging said slots, and pilots fastened to the truck and also engaging said slots.

2. A monorail system comprising a track having parallel slots therein, a truck, wheels mounted thereon and each having flanges engaging said slots, a cross beam upon the truck, pilots depending therefrom and engaging each one of said slots.

3. A monorail system comprising a track having parallel slots therein, a truck, wheels mounted thereon and each having flanges engaging said slots, a cross beam upon the truck, pilots depending therefrom and engaging each one of said slots, and cables fastened to the track and arranged in pairs and adapted to support the wheels as they leave the track.

In testimony whereof I hereunto affix my signature in the presence of two witnesses.

FRANK P. DERR.

Witnesses:
    FRANKLIN H. HOUGH,
    A. L. HOUGH.

---

Copies of this patent may be obtained for five cents each, by addressing the " Commissioner of Patents, Washington, D. C."